(12) United States Patent
Doebertin et al.

(10) Patent No.: US 7,681,951 B2
(45) Date of Patent: Mar. 23, 2010

(54) ARRANGEMENT FOR ACCOMMODATING PASSENGERS; VEHICLE FOR TRANSPORTING PASSENGERS

(75) Inventors: Oliver Doebertin, Hamburg (DE);
Alexander Niesigk, Voesendorf (AT);
Andreas Peppel, Hamburg (DE);
Werner Granzeier, Jork (DE)

(73) Assignee: Airbus Deutschland GmbH (DE)

( * ) Notice: Subject to any disclaimer, the term of this patent is extended or adjusted under 35 U.S.C. 154(b) by 0 days.

(21) Appl. No.: 11/590,084

(22) Filed: Oct. 31, 2006

(65) Prior Publication Data

US 2007/0164591 A1    Jul. 19, 2007

(30) Foreign Application Priority Data

Oct. 31, 2005  (DE) .................... 10 2005 051 988

(51) Int. Cl.
*A47C 15/00* (2006.01)
*B64D 11/06* (2006.01)

(52) U.S. Cl. .............. 297/245; 244/118.6; 105/316
(58) Field of Classification Search ........... 297/245; 244/118.6; 5/9.1; 105/316
See application file for complete search history.

(56) References Cited

U.S. PATENT DOCUMENTS 2,092,655 A  *  9/1937  Page, Jr. ............. 244/118.6
2,124,003 A     7/1938  McDonnell, Jr. et al.
2,654,895 A    10/1953  Stevens
4,018,166 A  *  4/1977  Gutridge et al. ........ 105/316
6,056,239 A  *  5/2000  Cantu et al. ........ 244/118.6 X

FOREIGN PATENT DOCUMENTS

| DE | 37 42 905 | | 7/1988 |
| DE | 101 38 926 | | 2/2003 |
| EP | 291894 | A2 * | 11/1988 |
| WO | WO-02/28712 | | 4/2002 |

* cited by examiner

*Primary Examiner*—Anthony D Barfield
(74) *Attorney, Agent, or Firm*—Lerner, David, Littenberg, Krumholz & Mentlik, LLP

(57) ABSTRACT

A passenger compartment with first through fourth placement spaces that include first through fourth accommodation units, where the accommodation units are of a modular design. The first and second accommodation units are a first seat and a second seat which can both be changed between a sitting position and an essentially horizontal resting position. The first and second placement spaces are arranged in one placement plane facing each other. The third placement space is arranged beside the first placement space and the fourth placement space is arranged beside the second placement space. The arrangement includes a delimiting element arranged laterally beside the first and second placement spaces and extending to be perpendicular in relation to the placement plane. First and second couchette elements are affixable to the delimiting element such that passengers can be accommodated who are in positions lying down above the first and second placement spaces.

17 Claims, 2 Drawing Sheets

ARRANGEMENT FOR ACCOMMODATING PASSENGERS; VEHICLE FOR TRANSPORTING PASSENGERS

CROSS-REFERENCE TO RELATED APPLICATIONS

This application claims the benefit of the filing date of the German Patent Application No. 10 2005 051 988.1, filed Oct. 31, 2005, the disclosure of which is hereby incorporated herein by reference.

BACKGROUND OF THE INVENTION

The invention relates to an arrangement for accommodating passengers, which arrangement comprises at least two seats that can be adjusted between a sitting position and a position for lying down. The invention further relates to a vehicle for transporting passengers.

In recent times the internationalisation of the economy, trade and tourism has resulted in a steady increase in traffic. Not only the number of travelling passengers but also the average distance of travel has continually increased. No change to this trend is envisaged so that an ongoing increase in traffic is expected for the future.

In order to make it possible to transport passengers as economically as possible, various arrangements for accommodating passengers have been developed for the different means of transport, with which arrangements as many passengers as possible can be transported within a limited space. Such arrangements are also known as passenger compartments. However, it should be ensured that travelling, in particular long-distance travelling, does not become too uncomfortable for passengers in order to prevent travel-related exhaustion. The two requirements of high passenger density on the one hand and good travel comfort on the other hand present two competing requirements that are in a natural state of tension. To ease this state of tension it is known to offer two different passenger classes that provide very considerable differences both in travel comfort and in the price of travel. In this way passengers have the choice of selecting between economical travel with little travel comfort, and expensive travel with excellent travel comfort.

In aircraft, the so-called economy class provides the opportunity to incline the backrest backwards by approximately 30 degrees. However, with a seat pitch of as little as 762 mm it is, as a rule, not possible for passengers to stretch their legs. Some airlines offer a so-called "premium economy class", which provides at least a footrest and an improved headrest. However, "premium economy class" requires approximately 20% more space than normal economy class. When compared to economy class, business class and first class with a seat pitch of up to 2260 mm provides a lot of space so that here too there is sufficient leg room for passengers to put their feet up. However, first class and business class require too much space for travel to be able to be offered at a financially attractive price.

In the case of ferries, there are usually also several passenger classes. The better classes provide normal beds that require a correspondingly large space. In the lesser classes, often comparatively uncomfortable couchettes are installed that require little space when compared to conventional beds.

In the case of boats and yachts there are normal beds that are arranged so as to be interlocked. Likewise, beds are used whose shapes match the shape of the boat or yacht. For example, there are beds in a V-shape which are located at the bow of the boat or yacht.

In the case of buses a concept is known in which in a passenger seat, below the seat area that can be slid forward, there is a further bench under said seat area. This results in a surface for lying on, together with a further seat row. At the top the backrest is rotatably held on an arm so that said backrest can be moved to a horizontal position and, together with the backrests of the other seat rows, opens a second surface for lying on. This concept is associated with a disadvantage in that all the passengers on a seat bench have to assume a position lying down as soon as one passenger wishes to lie down to sleep.

SUMMARY OF THE INVENTION

It is the object of the invention to create a compact arrangement for accommodating passengers, as well as to create a vehicle that provides excellent travel comfort for passengers.

According to one embodiment variant of the present invention, an arrangement for accommodating passengers is created. The arrangement comprises a first placement space that comprises a first accommodation unit, and a second placement space that comprises a second accommodation unit. The two placement spaces are arranged in one placement plane so as to face each other. The arrangement further comprises a delimiting element that is arranged laterally beside the first and the second placement spaces and that extends so as to be perpendicular in relation to the placement plane, and comprises a couchette element that is designed and affixed to the delimiting element such that a passenger can be accommodated who is in a position lying down above the first and second placement spaces. In this arrangement the first accommodation unit is a first seat, and the second accommodation unit is a second seat. The first seat and the second seat can each be changed between a sitting position and the essentially horizontal resting position such that—provided the two seats are in a sitting position—the first seat and the second seat can each accommodate a passenger who is in a sitting position, and—provided the two seats are in their essentially horizontal resting position—the first seat and the second seat together can accommodate one passenger who is in a position lying down.

In this context, the characteristic according to which a passenger can be accommodated who is in a position lying down above the first and the second placement spaces refers to the couchette element being directly, i.e. without any lateral offset, above the first and the second seats. This means that the described arrangement can accommodate two passengers, each in a position lying down, in a way that is similar to that of a bunk bed. In this arrangement one passenger is on the couchette element whereas the other passenger is on the two seats arranged below said couchette element.

It is assumed that with the described arrangement a passenger compartment can be realised in which the ratio of required space to utility is acceptable even in aircraft applications. Thus the described arrangement can also be used for economy class in aircraft so that a considerable improvement in passenger comfort can be achieved. This is in particular due to the arrangement making it possible at night to transport passengers in a position lying down.

It should be pointed out that the invention is, however, not at all limited to use in passenger aircraft. A space-saving arrangement of passengers that depending on personal preference are either in a sitting position or in a position lying down is of advantage in any type of passenger transport vehicle.

According to a further exemplary embodiment, the arrangement comprises a further couchette element that is designed and affixable to the delimiting element such that a further passenger can be accommodated who is also in a position lying down above the first and second placement spaces. In an advantageous manner the second couchette element makes it possible to increase the accommodation capacity of passengers in a position lying down, without increasing the placement surface required for the entire arrangement. If two couchette elements are used, three persons can thus sleep on surfaces one on top of the other. If additional couchette elements are used that are arranged one on top of the other, which use is applicable in particular in the case of large volume aircraft where the cabin is high, it is thus possible to accommodate still further passengers.

According to a further exemplary embodiment, the arrangement comprises a folding mechanism that is provided for attaching a couchette element to the delimiting element. In this arrangement the folding mechanism can be designed such that the couchette element is hingeable between two positions. In the first position, which is the folded-in position, the couchette element rests against the delimiting element, thus not causing any restriction in the freedom of movement of passengers. In the second position, which is the folded-out position, the top of the couchette element provides a passenger with a preferably upholstered surface for lying on. Hingeing from the folded-out position and the folded-in position takes place, for example, by lifting the part of the couchette element that is spaced apart from the delimiting element. Preferably, the couchette element can be affixed in both positions. In this way the arrangement described above can further be designed such that all the regulations and requirements of the aeronautical authorities with respect to passenger safety are met, even in turbulent phases of flight.

According to a further exemplary embodiment, the delimiting element is a separation element that is suitable for delimiting the arrangement from further arrangements for accommodating passengers. Thus a multitude of separate arrangements can be constructed in a space-saving manner in a large passenger compartment. This design is based on the assumption that separate individual compartments also improve travel comfort in that each passenger is accommodated together with only a comparatively small number of other passengers.

It is also possible to arrange two arrangements side-by-side such that both compartments share a common separation element. The shared separation element can also comprise two individual elements that are arranged as closely together as possible. In this case the couchette elements that are associated with different arrangements can be affixed to the shared separation element.

According to a further exemplary embodiment, the delimiting element forms part of an exterior wall of a passenger compartment. The arrangement can thus also be constructed on the exterior walls of a large passenger compartment.

According to a further exemplary embodiment, the arrangement additionally comprises at least one side wall that is aligned so as to be at an angle in relation to the delimiting element, with said side wall extending so as to be perpendicular in relation to the placement plane. In an advantageous manner the side wall as well as the delimiting element can serve to delimit the compartment from other passenger compartments or if applicable from the exterior of a passenger compartment which comprises several compartments.

According to a further exemplary embodiment, the arrangement additionally comprises at least one receptacle that is arranged underneath the seat area of a seat. In this arrangement the receptacle can be a floor cabinet that ensures safe and space-saving stowage of items of baggage.

According to a further exemplary embodiment, the first seat and the second seat can be changed by tilting a backrest between the sitting position and the essentially horizontal resting position. In this way in a particularly simple manner the two seats can create the lowermost surface for lying on.

According to a further exemplary embodiment, the first seat and the second seat comprise a four-link arrangement. In this way it becomes possible for the rears of the backrests in the tilted state to cover the entire arrangement along one direction so that a correspondingly long flat surface for lying on is created.

According to a further exemplary embodiment, the arrangement additionally comprises an access device that a) is situated beside the first placement space and/or beside the second placement space; that b) extends so as to be perpendicular in relation to the placement plane; and that c) is designed such that it is made easier for a passenger to climb to a couchette element. In this arrangement the access device can, for example, comprise a preferably narrow stair, wall bars, a ladder and/or, if applicable, fold-out foothold pegs. It should be pointed out that in particular if a ladder is used as an access device to surfaces for lying on in the upper levels, safety aspects that are relevant in the context of aeronautics can be taken into account and the respective regulations for safe civil aviation can be met.

According to a further exemplary embodiment, the arrangement additionally comprises a) a third placement space that comprises a third accommodation unit, and b) a fourth placement space that comprises a fourth accommodation unit, wherein the third placement space is arranged beside the first placement space, and the fourth placement space is arranged beside the second placement space so that the first and the third accommodation units as well as the second and the fourth accommodation units are arranged so as to face each other. Such an arrangement, in which two placement spaces each, namely the first and the third placement spaces, as well as the second and the fourth placement spaces are arranged along a row, provides a particularly compact passenger compartment that in a space-saving manner can accommodate several passengers. In this way the passenger compartment that comprises four placement spaces provides a particularly successful solution in passenger aircraft, as far as ergonomics, space/performance ratio and weight are concerned, for the effective transport of passengers.

According to a further exemplary embodiment, the individual accommodation units are of a modular design so that a simple exchange of accommodation units for other accommodation units is possible. A modular design of passenger compartments provides the option of dimensioning the individual accommodation units such that they pass through the comparatively small aircraft door. This in turn provides the possibility, with a corresponding rearrangement, of optimally matching the individual compartments at any time to the respective actual demand. Modular design of the compartments thus makes it possible for airlines to quickly react to fluctuating passenger demand because the compartments can be installed or removed overnight. This means that optimal adaptation of the interior layout of aircraft can take place during overnight stops.

According to a further exemplary embodiment, the third accommodation unit is a third seat. In this way the number of seats available in the passenger compartment can be increased in a simple manner. The third seat can be designed so as to be analogous to the first two seats and can in particular comprise a fold-down backrest that if necessary can also be adjustable by way of a four-link arrangement.

According to a further exemplary embodiment, the third seat, too, can be changed between a sitting position and an essentially horizontal resting position such that the first, the second and the third seats form a common surface for lying on, provided that each of these three seats is in its essentially horizontal resting position. Thus with the use of three seats a large and comfortable surface for lying on can be created, in which position taller passengers too can enjoy a comfortable sleeping position.

According to a further exemplary embodiment, the fourth accommodation unit is a fourth seat. In this way a seat- and sleeping compartment in particular for economy class in aircraft can be created, wherein in the smallest possible space several passengers have the opportunity, independently of each other, to take up a position lying down or a sitting position. In cases where the arrangement comprises at least two couchette elements, affixed above the first and second seats to the delimiting element, three passengers can thus take up a position lying down in the compartment. Two of the three passengers are accommodated on the two couchette elements, while one of the three passengers is accommodated on the seats that have been converted to form a surface for lying on. In this arrangement the surface for lying on can also be formed by the first and second seats and if required also by the third seat. In any case, the person accommodated on the fourth seat in a sitting position can enjoy considerably more leg room when compared to the case in which the third seat, too, is occupied by a seated passenger.

According to a further exemplary embodiment, the third and fourth seats can be changed between a sitting position and an essentially horizontal resting position such that these two seats form a common surface for lying on, provided that each of these two seats is in its essentially horizontal resting position. In this way a further surface for lying on can be provided, which surface, when compared to the above-described surface for lying on, essentially comprises three seats and is suitable in particular for somewhat shorter persons. Likewise it is imaginable that this further surface for lying on, together with the surface for lying on that is provided by the first and second seats, forms a common large surface for lying on, in which in a particularly comfortable manner one person or two persons familiar with each other can lie down. The fourth seat can be designed so as to be exactly the same as the first and/or the second seat.

If the arrangement comprises at least two couchette elements, it is thus possible to implement a sleeping compartment, in particular for economy class in aircraft, which sleeping compartment makes it possible for four passengers to be in the compartment, wherein each passenger is independent of the other passengers. The available space is thus optimally used for the comfortable transport of a maximum number of passengers.

According to a further exemplary embodiment, the fourth accommodation unit is a receptacle. Such a receptacle can be a baggage accommodation unit such as for example a shelf or a cabinet wherein baggage, or if need be some other material that is required on board, can safely be kept. It is thus possible to reliably prevent objects from falling out or down from said baggage accommodation unit. Of course, if the receptacle is a shelf, it must be ensured that any objects in the shelf are fastened by way of suitable measures.

According to a further exemplary embodiment, the baggage accommodation unit comprises a closing element. For example a cabinet door is suitable as a closing element, which door prevents objects from falling out and also makes it possible to lock the baggage accommodation unit.

According to an embodiment variant of the present invention, a vehicle for transporting passengers is created, which vehicle comprises at least one arrangement for accommodating passengers. Possible embodiments of the arrangement are described above.

According to a further exemplary embodiment, the vehicle is an aircraft. The arrangement thus makes it possible to transport many economy class passengers in an aircraft in a limited passenger compartment with comparatively good seating and sleeping comfort.

According to a further exemplary embodiment, the vehicle is a water craft, a rail vehicle or a motor vehicle. The arrangement described above can thus be used as a passenger compartment in various vehicle types such as, for example, in ships, in trains or in buses so that many passengers can be transported in a confined space with comparatively good seating and sleeping comfort, not just in aircraft.

BRIEF DESCRIPTION OF THE DRAWINGS

Further advantages and characteristics of the present invention are contained in the following exemplary description of the presently preferred exemplary embodiments. The drawing diagrammatically shows the following.

DETAILED DESCRIPTION

Figure 1:
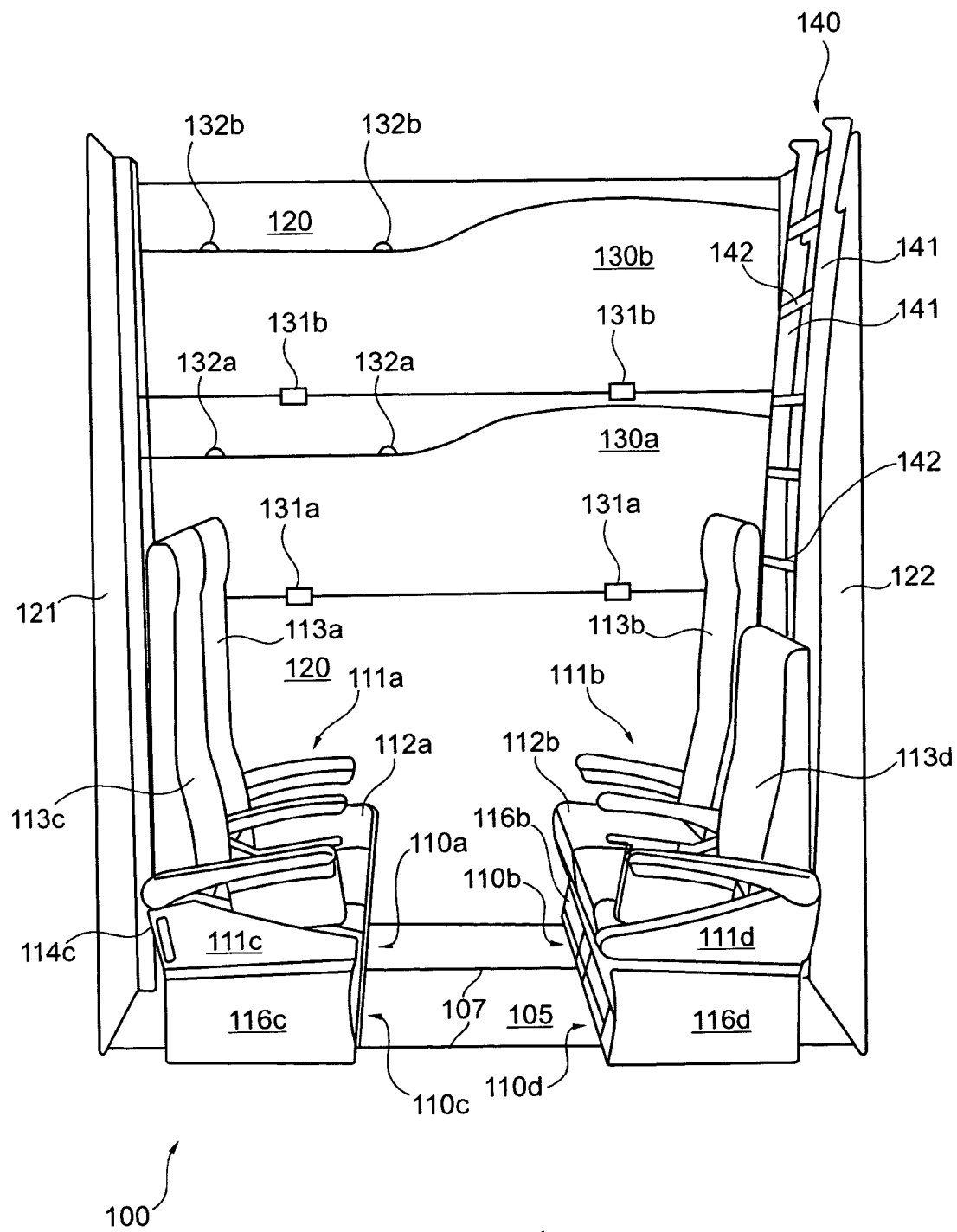
FIG. 1 a passenger compartment comprising four placement spaces and two couchettes, wherein all the placement spaces are occupied with one seat each that has a tiltable backrest.

It should be noted that in the drawings reference characters of identical or corresponding components only differ by their first digit.

FIG. 1 shows a seat- and sleeping compartment 100 which, for example together with many other corresponding compartments, has been constructed in the passenger compartment of an aircraft. The compartment 100 is on a floor area 105 of the passenger compartment, which floor area 105 serves as a placement plane for some of the components of the compartment 100, which components are described below. The described seat- and sleeping compartment 100 comprises a first placement space 110a, a second placement space 110b, a third placement space 110c, as well as a fourth placement space 110d. Each of the placement spaces 110 is occupied by a seat. Thus a first seat 111a is on the first placement space 110a, a second seat 111b on the second placement space 110b, a third seat 111c on the third placement space 110c, and a fourth seat 111d on the fourth placement space 110d. Each of the seats is affixed to an attachment strip 107 contained in the floor area 105 so that any sliding of the seats is impossible, even during any turbulent flight phases that may occur. Each of the seats comprises a seat area, wherein in FIG. 1 only the first seat area 112a associated with the first seat 111a, and the second seat area 112b associated with the second seat 111b are shown. Furthermore, each seat comprises a backrest, wherein in a corresponding way a first backrest 113a is associated with the first seat 111a; a second backrest 113b is associated with the second seat 111b; a third backrest 113c is associated with the third seat 111c; and a fourth backrest 113d is associated with the fourth seat 111d. The seats 111a, 111b, 111c and 111d are arranged such that in each case two twin-seat rows face each other.

Towards the rear the compartment 100 is delimited by a delimiting wall 120, on the left-hand side by a left-hand partition wall 121, and on the right-hand side by a right-hand partition wall 122. All the walls 120, 121 and 122 extend upwards so as to be perpendicular in relation to the placement plane 105. The delimiting wall 120 or the delimiting walls 121 and 122 can delimit the compartment 100 from other compartments. Likewise, the walls 120, 121 and 122 can delimit the compartment 100 from the external environment of a larger passenger compartment so that these walls are effectively an exterior wall of the passenger compartment or at least rest against an exterior wall of the passenger compartment.

At the delimiting wall 120 a first couchette 130a is attached by way of a hinge 131a, and a second couchette 130b is attached by way of a hinge 131b. In this arrangement the hinges 131a and 131b are designed such that the first couchette 130a and the second couchette 130b can be hinged between two positions. In a first position, which is the folded-in position, shown in FIG. 1, the two couchettes 130a and 130b rest against the delimiting wall in a folded-up state. The freedom of movement of the passengers in the interior of the compartment 100 is thus not limited so that the seats 111a and 111b on the delimiting wall 120 can also be used. In the second position, which is the folded-out position, the tops of the couchettes 130a and 130b provide a surface for lying on, which surface is preferably upholstered. Hingeing from the folded-out position to the folded-in position takes place by lifting that part of the couchettes 130a and 130b, which part faces away from the hinges 131a and 131b. In both positions the couchettes 130a and 130b can be affixed by latching mechanisms (not shown) so that the two couchettes 130a and 130b in their affixed state are non-movable components of the compartment 100 thus meeting all the regulations and requirements of the aeronautical authorities with regard to a high standard of passenger safety, even during turbulent flight phases.

In order to provide excellent safety to persons lying on the couchettes 130a and 130b, each couchette 130a and 130b is provided by a securing hoop (not shown in FIG. 1) which is hingeably held on the couchettes 130a or 130b by way of a hinge 132a or 132b. In a first position, which is the folded-in position, the securing hoop is oriented so as to be parallel in relation to the surface for lying on of the couchette 130a or 130b. This makes it possible to fold-in the couchettes 130a or 130b so that in their folded-in state the couchettes 130a or 130b are close to the delimiting wall 120 so that in this way great freedom of movement in the compartment 100 is ensured. In a second position, which is the folded-out position, the securing hoop is oriented so as to be perpendicular in relation to the surface for lying on of the couchette 130a or 130b, thus preventing passengers who are lying on the couchettes 130a and 130b from accidentally falling out.

In order to facilitate climbing to the couchettes 130a and 130b, an access device is provided so that a passenger can reach the couchette 130a or 130b independently and without strenuous or complicated movement. According to the exemplary embodiment shown in FIG. 1, the access device is a ladder 140 that comprises two stiles 141 and a plurality of rungs 142. In order to make it possible to easily climb the ladder 140, the backrest 113d is tilted, which backrest. 113d is hingeably held by means of a hinge (not shown ). When compared with other access devices, such as for example a stair arrangement, the ladder 140 is associated with an advantage in that it keeps close to the partition wall 122, thus taking up only an insignificant part of the space that is effectively available in the compartment 100. The ladder 140 is arranged behind the backrest 111d of the fourth seat 111d so that the access device does not have a negative effect on either the view or the escape routes and thus does not pose any danger to passengers. It should be pointed out that the access device can also be implemented in some other way, for example by a stair arrangement or by pins that can be folded out of the partition wall, or by steps. Each of the seats 111a, 111b and 111c comprises a hinge that makes possible defined forward tilting of the backrests 113a, 113b and 113c. According to the embodiment shown, each of the hinges is a four-link arrangement, wherein FIG. 1 only shows the four-link arrangement 114c in a diagrammatic manner. The four-link arrangements make it possible to tilt forward the backrests 113a, 113b and 113c, wherein tilting is not only on a single rotary axis. With the use of a four-link arrangement it is possible for the backrests 113a, 113b and 113c in their tilted state to form a surface for lying on across the entire length of the compartment 100. Even a taller person can comfortably lie on this surface for lying on, which is formed by the three backrests 113a, 113b and 113c. At the same time, a passenger seated in the fourth seat 111d enjoys particularly good legroom. Of course the fourth seat can also comprise a four-link arrangement in order to make it possible to tilt the fourth backrest 113d, as described above, for the purpose of convenient access to the ladder 140.

As an alternative, the fourth seat 111d can be tilted such that the fourth backrest 113d together with the third backrest 111c forms a surface for lying on, which surface is situated beside the surface for lying on that is formed by the backrests 113a and 113b.

It should be pointed out that the compartment 100 shown in FIG. 1 provides a seat with an upright seat position for each passenger, in particular during the takeoff and landing phases. In this way the currently applicable regulations and laws can be met, which regulations and laws prescribe an upright seat position during takeoff and landing.

In order to make it possible to safely stow away smaller items of baggage, a floor cabinet is associated with each seat 111a, 111b, 111c and 111d, which floor cabinet is located between the respective seat area and the floor area 105. For the sake of clarity, FIG. 1 shows only the floor cabinets 116b, 116c and 116d that are associated with the seats 111b, 111c and 111d.

Figure 2:
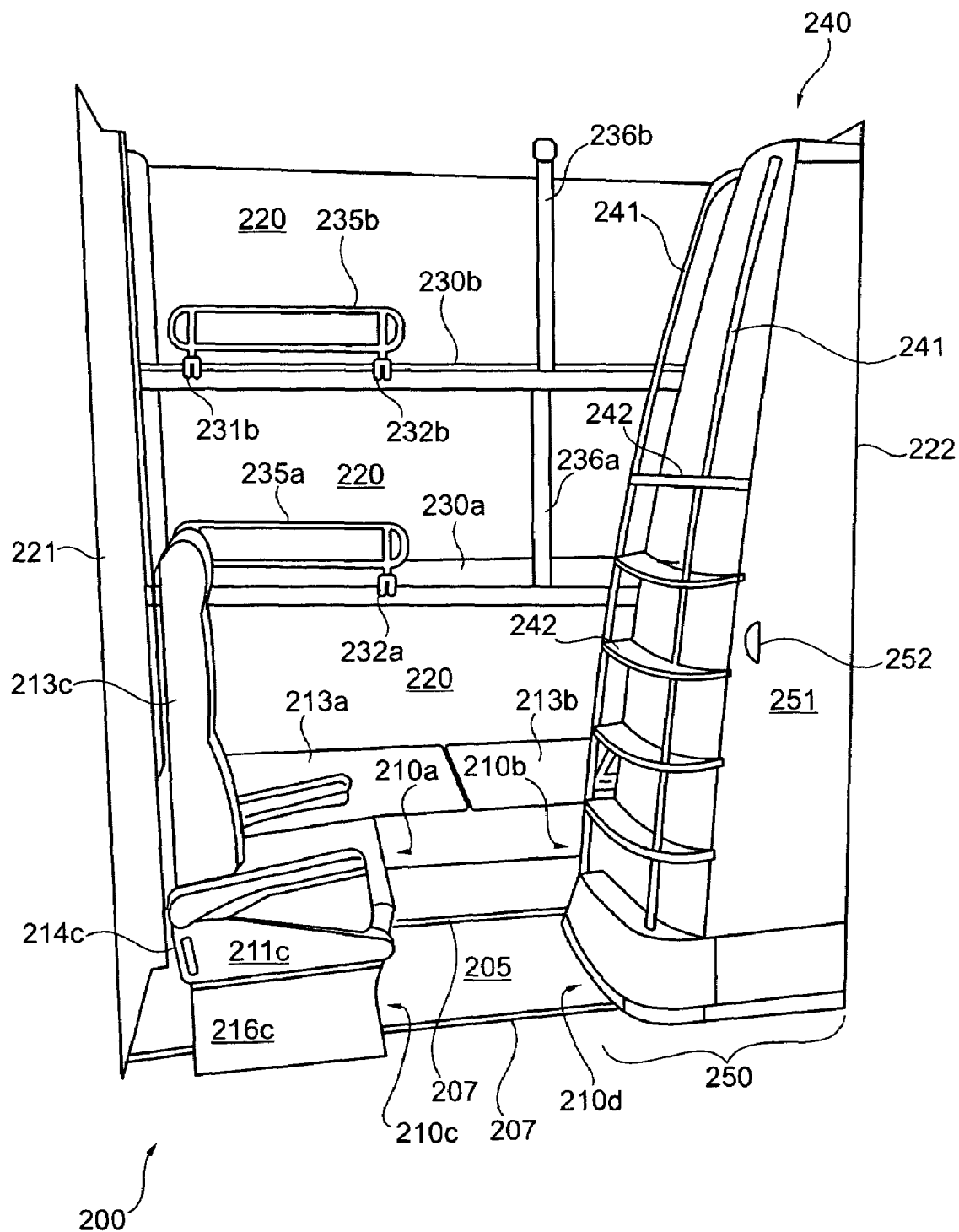
FIG. 2 a passenger compartment comprising four placement spaces and two couchettes, wherein only three placement spaces are occupied with one seat each that has a tiltable backrest, and a placement space with a baggage accommodation unit.

FIG. 2 shows a seat- and sleeping compartment 200 that differs from the compartment 100 shown in FIG. 1 in that on the fourth placement space 210d instead of a fourth seat a combination structure is provided that comprises a cabinet 250 as well as an access steps arrangement 240. The other components of the compartment 200 are identical to the components of the compartment 100 and are thus not explained anew in detail.

However, it should be pointed out that in FIG. 2 the two couchettes 230a and 230b are shown in their folded-down state. Therefore the two securing hoops 235a and 235b are shown, which, although not shown in FIG. 1, have already been described above. The securing hoops 235a and 235b are hingeably attached to the couchettes 230a and 230b by means of the hinges 232a and 232b. Also shown are two retaining straps 236a and 236b. One end of the retaining strap 236b of the upper couchette 230b is attached to the ceiling (not shown) of the compartment 200. The other end is attached to the front edge of the folded-out upper couchette 230b. The retaining strap 236b ensures that the couchette 230b cannot fold further downwards so that in the folded-down state of the couchette 230b a horizontal surface for lying on is ensured, and accidental sliding out of a passenger is impossible. The retaining strap 236a of the lower couchette 230a serves the same purpose, wherein said retaining strap 236a is attached on the one hand to the underside of the folded-down couchette 230b and on the other hand to the front edge of the folded-out couchette 230a.

The cabinet 250 comprises a cabinet door 251 as a closing element, which cabinet door 251 can in a simple manner be opened and closed by means of a handle. By way of a door lock (not shown) the cabinet door 251 can be locked so that accidental falling out of objects, for example of items of baggage, is impossible. This cabinet is provided to stow passengers' items of travel baggage. In this way the safety regulations and requirements of the aeronautical authorities, which regulations and requirements relate to luggage transport, can be met.

The access steps arrangement 240, which is integrated in the cabinet 250, comprises two stiles 241 as well as a plurality of step elements 242. The combination of a cabinet 250 and an access steps arrangement 240 provides an advantage in that no tilting of a backrest is required in order to climb to the upper couchettes 230a and 230b. For this reason the compartment 200 takes up somewhat more space for each passenger than is the case in the passenger compartment 100 shown in FIG. 1, however the convenience of the travelling passengers, who can have the three positions as desired, is correspondingly improved.

In addition, it should be pointed out that "comprising" does not exclude other elements or steps, and "a"or "one" does not exclude a plural number. Furthermore, it should be pointed out that characteristics or steps which have been described with reference to one of the above exemplary embodiments can also be used in combination with other characteristics or steps of other exemplary embodiments described above. Reference characters in the claims are not to be interpreted as limitations.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

LIST OF REFERENCE CHARACTERS

100 Seat- and sleeping compartment
105 Placement plane/floor area
107 Attachment strip
110a First placement space
110b Second placement space
110c Third placement space
110d Fourth placement space
111a First seat
111b Second seat
111c Third seat
111d Fourth seat
112a, b Seat area
113a, b, c, d Backrest
114c Four-link arrangement
116b, c, d Floor cabinet
120 Delimiting wall
121 Left-hand partition wall
122 Right-hand partition wall
130a First couchette
130b Second couchette
131a, b Hinge
132a, b Hinges for securing hoop
140 Access ladder
141 Stiles
142 Rungs
200 Seat- and sleeping compartment
205 Placement plane/floor area
207 Attachment strip
210a First placement space
210b Second placement space
210c Third placement space
210d Fourth placement space
211c Third seat
213a, b, c Backrest
214c Four-link arrangement
216c Floor cabinet
220 Delimiting wall
221 Left-hand partition wall
222 Right-hand partition wall
230 First couchette
230a Second couchette
232a, b Hinges for securing hoop
235a, b Securing hoop
236a, b Retaining strap
240 Access steps arrangement
241 Stiles
242 Step elements
250 Receptacle/cabinet
251 Closing element/cabinet door
252 Handle

The invention claimed is:

1. Passenger compartment for a vehicle, with the compartment comprising:
   a first placement space that comprises a first accommodation unit,
   a second placement space that comprises a second accommodation unit, wherein the two placement spaces are arranged in one placement plane so as to face each other,
   a third placement space that comprises a third accommodation unit,
   a fourth placement space that comprises a fourth accommodation unit,
   a delimiting element that is arranged laterally beside the first placement space and the second placement space and that extends so as to be perpendicular in relation to the placement plane, and
   a first couchette element, that is designed and affixed to the delimiting element such that a passenger can be accommodated who is in a position lying down above the first placement space and the second placement space,
   a second couchette element, that is designed and affixable to the delimiting element such that a further passenger can be accommodated who is also in a position lying down above the first placement space and the second placement space
   wherein the individual accommodation units are of a modular design dimensional to fit through an access door, so that a simple exchange of accommodation units for other accommodation units is possible; wherein the third placement space is arranged beside the first placement space, and the fourth placement space is arranged beside the second placement space so that the first accommodation unit and the third accommodation unit as well as the second accommodation unit and the fourth accommodation unit are arranged so as to face each other;
   wherein the first accommodation unit is a first seat, and the second accommodation unit is a second seat, and the first seat and the second seat can be changed between a sitting position and an essentially horizontal resting position such that
provided the two seats are in their sitting position, the first seat and the second seat can each accommodate a passenger who is in a sitting position, and
provided the two seats are in their essentially horizontal resting positions, the first seat and the second seat together can accommodate one passenger who is in a position lying down
wherein the fourth accommodation unit is a combination of a cabinet and access steps, the cabinet extending from a cabin floor to a cabin ceiling, and the access steps facing towards the third placement space.

2. The compartment of claim 1, further comprising:
at least one folding mechanism that is provided for attaching a couchette element to the delimiting element.

3. The compartment of claim 1, in which
the delimiting element is a separation element that is suitable for delimiting the compartment from further passenger compartments.

4. The compartment of claim 1, in which
the delimiting element forms part of an exterior wall of a passenger compartment.

5. The compartment of claim 1, additionally comprising:
at least one side wall that is aligned so as to be at an angle in relation to the delimiting element, with said side wall extending perpendicularly in relation to the placement plane.

6. The component of claim 1, further comprising
at least one receptacle that is arranged underneath the seat area of a seat.

7. The compartment of claim 1, in which
the first seat and the second seat can be changed each with by tilting a backrest between the sitting position and the essentially horizontal resting position.

8. The compartment of claim 7, in which
the first seat and the second seat comprise a four-link arrangement.

9. The compartment of claim 1, further comprising:
an access device that is situated beside the first placement space and/or the second placement space, which access device extends so as to be perpendicular in relation to the placement plane, and which is designed such that it is made easier for a passenger to climb to a couchette element.

10. The compartment of claim 1, in which
the third accommodation unit is a third seat.

11. The compartment of claim 10, in which
the third seat can be changed between a sitting position and an essentially horizontal resting position such that the first seat, the second seat and the third seat form a common surface for lying on, provided that each of these three seats is in its essentially horizontal resting position.

12. The compartment of claim 1, in which
the receptacle comprises a closing element.

13. A vehicle for transporting passengers, which vehicle comprises
the passenger compartment of claim 1.

14. The vehicle of claim 13, wherein
the vehicle is an aircraft.

15. The vehicle of claim 13, wherein
the vehicle is a water craft, a rail vehicle or a motor vehicle.

16. The compartment of claim 1, wherein the accommodation units in the compartments can be at least one of rearranged, removed, and added based on passenger demand.

17. The cabinet of claim 1, wherein the cabinet can be opened or closed by manipulating a handle.

\* \* \* \* \*